Aug. 17, 1965

M. D. PAYN ETAL 3,200,934

STICK FEEDER

Filed Nov. 23, 1962

*INVENTORS*
MARSHALL D. PAYN
HARRY I. TOEWS

BY *Eugene M. Eckelman*

ATTORNEY

United States Patent Office 3,200,934
Patented Aug. 17, 1965

3,200,934
STICK FEEDER
Marshall D. Payn, 5237 SW. Dosch Road, and Harry I. Toews, 3529 SE. Crystal Spring Blvd., both of Portland, Oreg.
Filed Nov. 23, 1962, Ser. No. 239,495
10 Claims. (Cl. 198—82)

This invention relates to new and useful improvements in feeding means and is particularly concerned with apparatus for feeding elongated sticks or strips into feed rolls of stickers, planers, sanders, and similar machines.

A primary objective of the present invention is to provide stick feeding apparatus having novel feed means capable of feeding sticks of any length from a hopper into feed rolls.

Another object of the present invention is to provide a stick feeder having novel means for gripping sticks to be fed wherein to apply a positive gripping force on said sticks as well as automatically to adjust to the width of the sticks.

Another and important object of the present invention is to provide a stick feeder which is simple in construction and inexpensive to manufacture.

Another object is to provide a stick feeder having a novel drive system to accomplish feeding and retracting strokes.

Briefly stated, the present invention comprises a feed table adapted to receive sticks on its upper surface and adapted for movement longitudinally in feeding and retracting strokes. This feed table has a pair of pawls on the upper surface thereof which cooperate to grip the side edges of the sticks to be fed and which feed said sticks one at a time in the feeding strokes. The feed table is driven in both directions by power means and the operation of such power means is controlled by a novel arrangement of switches in a circuit with a solenoid operated three way valve.

The invention will be better understood and additional objects thereof will become more apparent from the accompanying specification and claims considered together with the accompanying drawings, wherein like numerals of reference indicate like parts, and wherein:

Figure 1:
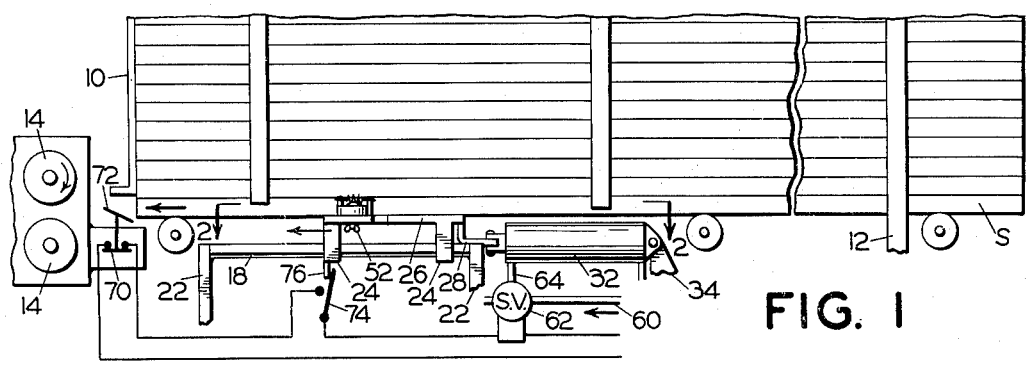
FIG. 1 is a side elevational view of the present feeding apparatus.

Referring now particularly to the drawings the present feeding apparatus is associated with a vertical hopper 10 employing side standards 12 between which material is placed for depositing by gravity on movable feeding means of the present apparatus. It is to be understood that the present feeding means, referred to as a stick feeder, may be employed for feeding various lumber products, or of course may be utilized to feed still other products.

The present apparatus is utilized in combination with a pair of feed rolls 14 at the front thereof or other structure which conveys material forwardly once the latter has been fed thereto. Such rolls may or may not comprise a part of the present invention depending upon the use thereof. There is utilized a pair of horizontal, stationary rails 18 connected together in spaced relation by front and rear frame members 20 supported by upright standards 22.

Slidably supported on the rails 18 through the medium of depending bearings 24 is a feed table or carriage 26 attached by means of a rear bracket 28 to the outer end of a piston rod 30 projecting from a fluid operated cylinder 32. Cylinder 32 is mounted in a stationary position on an upright frame member 34. The inner end of piston rod 30 carries a piston head 36, and disposed within the cylinder 32 between the head 36 and the rear wall of the cylinder is a compression spring 38 which biased the piston head to the left as viewed in FIGS. 1 and 2.

The feed table 26 carries a pawl 42 mounted in a stationary position on its upper surface by means of fastening bolts 43 which are removably for replacement of the pawl. This pawl is transversely disposed and has teeth 44, or some type of friction means, on its inner end the sharpened edges of which are substantially vertically aligned with the inner confines of one side of the hopper 10. Pawl 42 is slightly forwardly angled for obtaining a positive grip on sticks S to be fed into the rollers 14 from the hopper.

The feed table also carries a transversely disposed pawl 46 on its upper surface. This pawl also has end teeth 44, or some type of friction means, and is pivotally attached to said table by a pivot pin 48 projecting downwardly through a transverse slot 50 in the feed table. The lower end of pivot pin 48 is threaded for receiving a wing nut 52, FIG. 1, whereby the pivoted pawl may be adjusted laterally to accommodate different widths of sticks S, it being understood that a well known pivot pin 48 is employed which permits the pawl 46 to rotate even though the wing nut is tightened. Removal of wing nut 52 from pin 48 permits the pawl 46 to be replaced.

Pawl 46 is normally held in a slightly forwardly angled position against a stop 54 by a tension spring 56 connected between the stop 54 and an upright pin 58 on the pawl. This spring is removably attached to the pin 58 so that if desired the pawl can be replaced. In this latter regard, and with regard to the pawl 42, wherein both these members are detachable from the feed table, pawls of varying thickness may be kept on hand and the ones used which most efficiently grip selected sticks to be fed into the feed rolls 14.

Also, the spring is completely removable from both pin 58 and stop 54 so that springs of varying tension may be used for reasons to be explained hereinafter.

Figure 4:
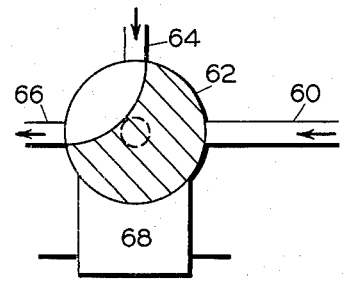
FIG. 4 is an enlarged sectional view illustrating valve structure for controlling the power means for driving the feed table.

Suitable fluid pressure drive means, not shown, drive the piston head 36 of the fluid operated cylinder 32 to the right against the action of spring 38. Such fluid pressure is fed to the cylinder 32 through a conduit 60 leading into a three way valve 62 into which also is connected a conduit 64 leading to the forward end of cylinder 32. Three way valve 62 is of a conventional type, employing a discharge conduit 66 and spring means, not shown, which normally urges the valve to an inoperative exhaust position, FIG. 4, wherein conduit 64 communicates with the discharge 66.

Valve 62 is opearted by a solenoid 68 which when energized rotates said valve in a clock-wise direction through about 90° to establish communication between the inlet conduit 60 and the conduit 64 leading to the cylinder 32.

Solenoid 68 is in a series circuit with a sensing device such as a pressure sensitive switch 70 normally held in closed position by suitable spring means not shown. Switch 70 has an inclined arm 72 disposed in the path of movement of sticks S as the latter are moved forwardly off the feed table 26. Also in this series circuit is a limit switch 74 adapted to be engaged and opened by a depending finger 76 on the feed table. Although this switch is shown positioned for engagement by the feed table, it could as well be operated by the power unit piston and accordingly pisitioned for engagement therewith.

As stated hereinbefore the three way valve 62 is normally held in a position wherein the forward end of cylinder 32 exhausts therethrough and that when the solenoid 68 is energized the valve it rotated to a position wherein fluid pressure is admitted to the forward end of cylinder 32. Thus, as long as one of the switches 70 or 74 is open, the circuit to the solenoid is open and the cylinder 32 is in exhaust condition. In such exhaust condition it is apparent that spring 38 will move the table to the left in FIGS. 1 and 2 comprising a feeding stroke.

Figure 2:
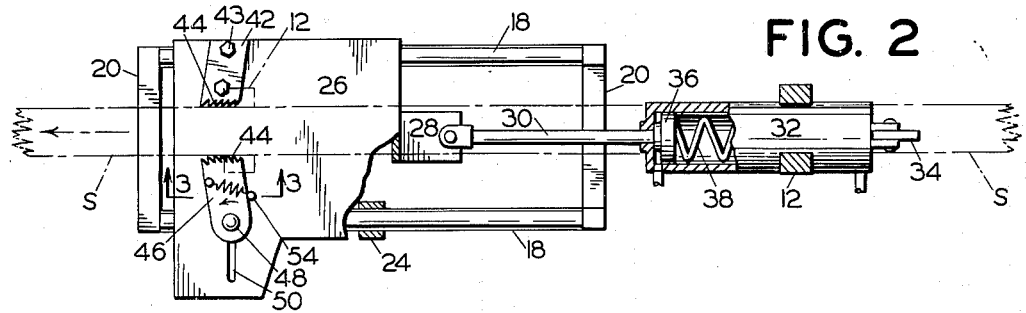
FIG. 2 is a plan view of the feeding apparatus with parts being broken away for clarity.
Figure 3:
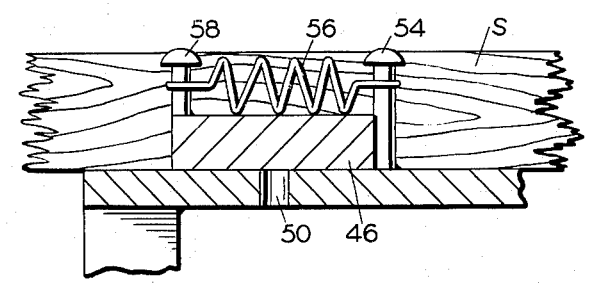
FIG. 3 is an enlarged sectional view taken on the line 3—3 of FIG. 2.

As seen in FIG. 1, switch 70 is positioned immediately forward of the front end of hopper 10 whereby it will be opened almost immediately upon forward movement of the lowermost stick in the hopper, and in this regard the switch 74 and its engaging finger 76 on the feed table are selectively operable such that upon forward movement of the feed table the switch 70 will be opened before the switch 74 is allowed to close.

In describing the operation of the present feeding apparatus reference is first made to FIG. 1 wherein the feed table is in its fully retracted position, i.e. the position wherein the switch 74 is opened by the finger 76. Thus, since one of the switches is open the solenoid 68 is in a de-energized condition and the valve 62 is in a normal rest condition wherein the forward end of cylinder 32 is open to atmosphere. Without any fluid pressure being exerted on the forward side of piston head 36 the spring 38 will urge the feed table forwardly. In this forward movement, the pawls 42 and 46 engage opposite side edges of a stick which has dropped on the table and grip it for forward movement with the table, the forwardly inclined relation of the two pawls serving to positively grip said stick. Forward movement of the feed table moves the front end of the stick S beyond the hopper into engagement with the switch 70. Since the switch 70 is opened before the switch 74 is allowed to close the forward end of cylinder 32 is open to atmosphere and the spring 38 is capable of moving the feed table the full stroke length thereof. The stroke length of the feed table need be of a length only to move the forward end of the sticks S into engagement with rolls 14.

When the stick has advanced sufficiently through the rolls to become disengaged from the switch 70, the latter will close and since the switch 74 is now closed a circuit to the solenoid 68 is closed and the valve 62 is rotated to a position wherein inlet conduit 60 communicates with the conduit 64 leading into the forward end of the cylinder 32. Fluid pressure admitted through the valve retracts the piston head 36 in the cylinder to retract the feed table. Such retracting movement will continue until the finger 76 on the feed table opens the switch 74 to break the circuit to the solenoid 68 and allow the cylinder 32 to exhaust its forward end whereby the spring 38 drives the feed table through the next feeding stroke.

As the stick is fed forwardly out of the hopper the next lowermost stick drops by gravity onto the feed table. Since the pawl 46 is adjusted transversely to a spacing from the other pawl which is less than the width of the sticks in the hopper, in order that a good grip can be obtained by the teeth on such sticks, the stick will generally lie on the upper surface of the pawl 46 at the tooth edge thereof. However, as the table retracts, the friction drag from engagement of the pawl with the stationary stick causes the pawl to rotate clear thereof and be pulled rearwardly into engagement with the stick. Immediately upon forward motion of the feed table, the teeth of the pawl 46, together with the teeth of pawl 42, grip the side edges for establishing a positive drive connection.

As mentioned hereinbefore, the springs 56 are removable for mounting a spring of desired tension. That is, a suitable spring is used which effectively maintains the pawl 46 against the stop when necessary but which permits this pawl to rotate forwardly as when it must free itself from under the pile of sticks in the hopper in the return movement of the feed table.

Thus, in accordance with the principles of the present invention there is provided a feeding apparatus which positively grips sticks and feeds them into feed rollers and at the same time automatically adjusts itself to minor differences in the width of the sticks being fed. If a major difference in width of sticks occurs, the pivot pin 48 may be adjusted accordingly.

Even though the present apparatus employs a relatively short feeding stroke it never-the-less operates efficiently in the feeding of long sticks if necessary. The operation thereof is fast so that substantially a continuous feed is established through the rolls 14.

It is to be understood that the form of our invention herein shown and described is to be taken as a preferred example of the same and that various changes in the shape, size and arrangement of parts may be resorted to without departing from the spirit of our invention or the scope of the subjoined claims. For example, drive means other than the air cylinder and control means therefor may be used such as an engine and clutch means.

Having thus described our invention, we claim:

1. Stick feeding mechanism comprising a forward end, discharge means disposed adjacent said forward end for receiving and conveying away sticks fed thereto, power driven means having forward and reverse movement and having a supporting surface arranged to receive sticks thereon for feeding the latter into said discharge means, a power circuit, control means in said circuit for said power driven means controlling forward and reverse movement of said power driven means, first and second operating means in said power circiut engageable respectively by said power driven means in its reverse position and sticks fed thereby to operate said control means for said power driven means, said operating means being connected in series whereby the power circuit to said power driven means is open when either operating means is open to allow return of said power driven means in one direction.

2. Stick feeding mechanism comprising a forward end, discharge means disposed adjacent said forward end for receiving and conveying away sticks fed thereto, power driven means having forward and reverse movement and having a supporting surface arranged to receive sticks thereon for feeding the latter into said discharge means, an electric circuit for said power driven means, electrically operated control means in said circuit controlling forward and reverse movement of said power driven means, first and second switches in said circuit engageable respectively by said power driven means in its reverse position and sticks fed thereby to operate said control means for said power driven means, said switches being connected in series whereby the circuit to said power driven means is open when either switch is open to allow return of said power driven means in one direction.

3. Stick feeding mechanism of claim 2 including spring means operative on said power driven means for returning the same in said one direction.

4. Stick feeding mechanism of claim 2 wherein said switches are spring biased to a close position, said first switch being open at the rearwardmost position of said power driven means and said second switch being opened only when a stick is being fed into said discharge means, whereby both of said switches are arranged to be closed when a stick is carried away by said discharge means and said power driven means is in a forward position to close the circuit to said electrically operated control means.

5. Stick feeding mechanism comprising a vertical hopper arranged to hold a plurality of sticks in horizontal position one upon the other for downward gravity feed, a reciprocating feed table below said hopper having a supporting surface arranged to receive sticks from said hopper, and a pair of transversely positioned pawls mounted on said feed table, said pawls having inwardly disposed stick engaging ends provided with gripping means, means to urge said pawls to grip the side edges of a stick supported on said supporting surface for moving the stick with the feed table in a forward movement of the latter, said means releasing said pawls from the stick in a return movement of the feed table, said pawls being disposed substantially vertically below said hopper and being selectively spaced transversely such that the stick engaging ends thereof engage the side edges of the stick in said forward movement.

6. The stick feeding mechanism of claim 5 wherein said pawls are mounted on said feed table independently of each other, one of said pawls being pivotally mounted on said feed table surface for adjusting movement to the width of sticks to be fed.

7. The stick feeding mechanism of claim 5 wherein said pawls are mounted on said feed table independently of each other, one of said pawls being pivotally mounted on said feed table surface, said pawl being pivoted forwardly to adjust to different stick widths, and means biasing said pawl against such forward rotation.

8. The stick feeding mechanism of claim 5 wherein said pawls are mounted on said feed table independently of each other, one of said pawls being pivotally mounted on said feed table supporting surface, said pawl being pivotal for forward movement to adjust to different stick widths, means biasing said pawl against such forward rotation, and stop means on said feed table on the rear side of said pivotal pawl to limit return movement of the latter under the action of said biasing means.

9. Stick feeding mechanism comprising a forward end, powered feed rolls disposed adjacent said forward end for receiving and conveying away sticks fed thereto, a vertical hopper arranged to hold a plurality of sticks in horizontal position one upon the other for downward gravity feed, a feed table having reciprocatory forward and retracting movement and having a supporting surface arranged to receive sticks thereon from said hopper for feeding them longitudinally forwardly into said feed rolls, and a pair of transversely positioned pawls mounted on said feed table, said pawls having inwardly disposed stick engaging ends provided with gripping means, means to urge said pawls to grip the side edges of a stick supported on said supporting surface for moving the stick with the feed table in a forward movement of the latter, said means releasing said pawls from the stick in a return movement of the feed table, said pawls being disposed substantially vertically below said hopper and being selectively spaced transversely such that the stick engaging ends thereof engage the side edges of the stick in said forward movement.

10. The stick feeding mechanism of claim 9 including power driven means for reciprocating said feed table, electric circuit means associated with said power driven means for controlling operation thereof, and switch means in said electric circuit dispose in the path of travel of the sticks in their forward longitudinal movement and adapted to control said power driven means to retract the feed table.

References Cited by the Examiner
UNITED STATES PATENTS

| | | | |
|---|---|---|---|
| 1,163,669 | 12/15 | Kourion. | |
| 1,706,533 | 3/29 | Lorig | 221—210 |
| 2,236,747 | 4/41 | Cameron | 198—170 |
| 2,529,777 | 11/50 | McInnis | 198—135 |

SAMUEL F. COLEMAN, *Primary Examiner.*

WILLIAM B. LA BORDE, *Examiner.*